Patented Aug. 11, 1931

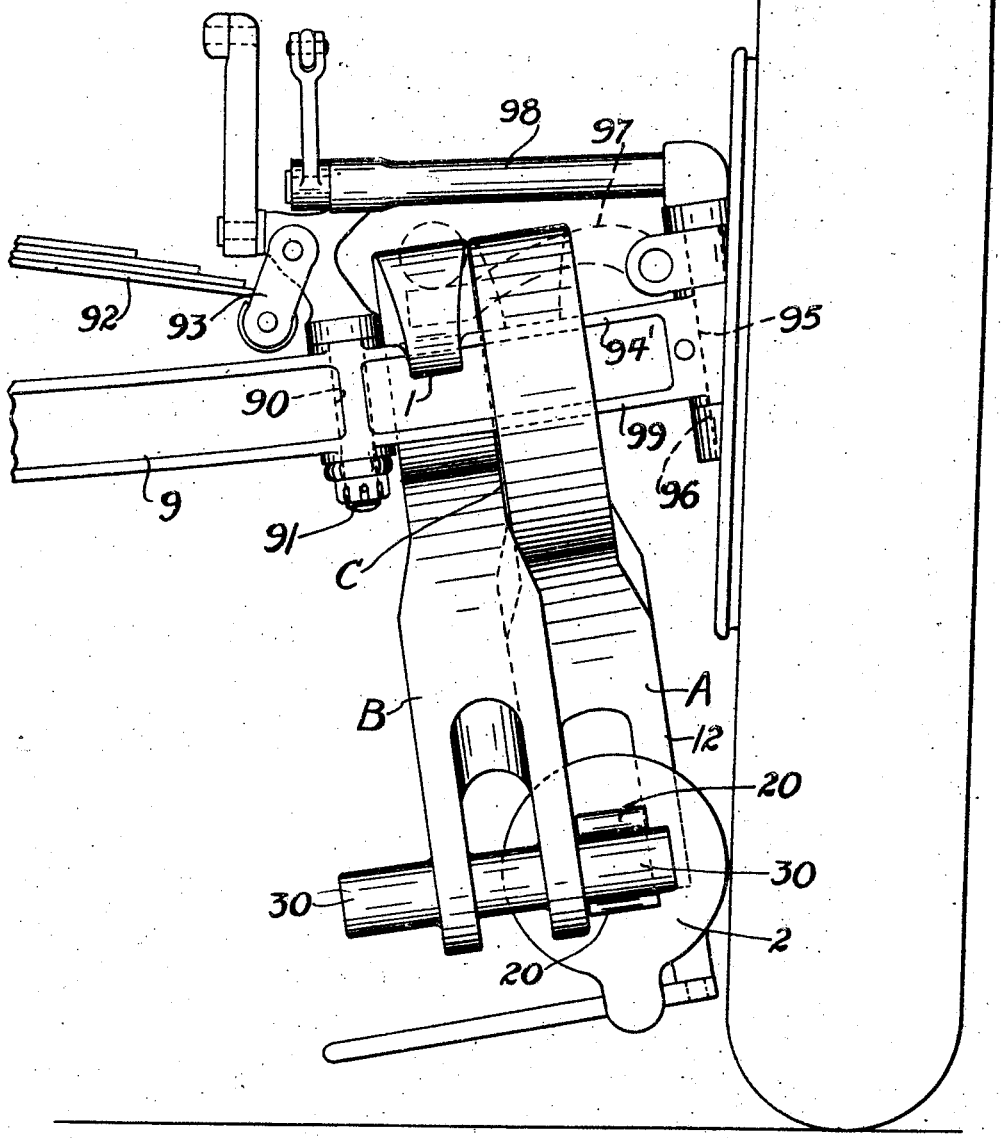

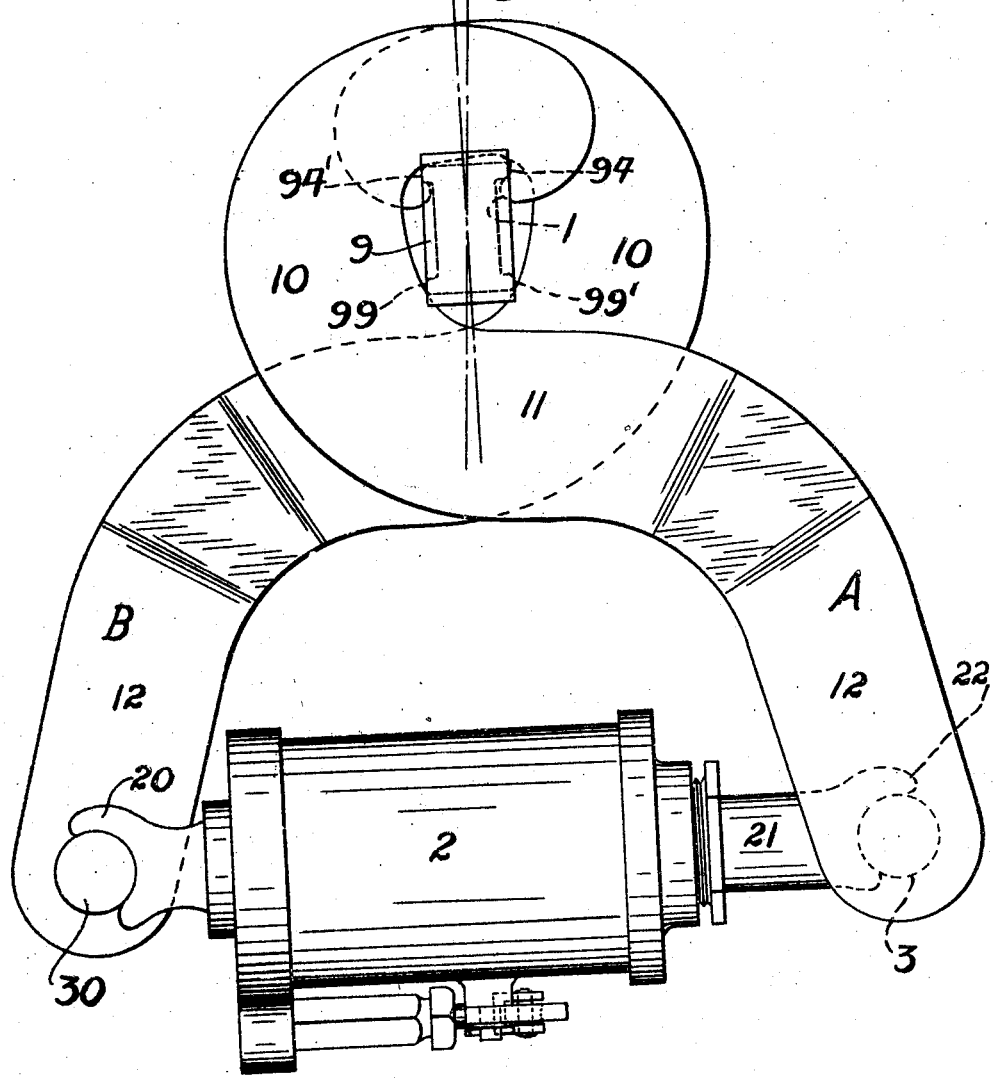

1,818,680

REISSUED

UNITED STATES PATENT OFFICE

CLAUDE C. BENNETT, OF SEATTLE, WASHINGTON, ASSIGNOR TO A. E. FERAGEN, INC., OF SEATTLE, WASHINGTON, A CORPORATION OF WASHINGTON

AXLE-TWISTING DEVICE

Application filed October 22, 1930. Serial No. 490,455.

My invention is directed to the provision of a means whereby axles may be twisted, within a short distance, for the purpose of adjusting caster.

My invention is particularly applicable to use upon Ford automobiles of the Model A type, which are provided with an axle of general I-beam section, which is curved or inclined upwardly at its ends, and which has a vertical aperture for the spring-perch bolt a short distance inward of the end, which end is vertically apertured to receive the king-pin bolt. In cars which are provided with longitudinally extending springs, seating upon a pad at the upper side of the axle, it is a simple matter to adjust for caster by the provision of tapered shims, but it is not possible in this type of spring suspension, wherein the spring extends transversely of the car, and is supported from the axle by spring-perch bolts extending therethrough. It is not desirable to throw the entire axle forwardly to adjust for caster, as this disturbs the spring suspension and tends to bend the spring-perch bolt, but there are many times when it is desirable to adjust the caster or inclination of the king-pin, and this must be done without disturbing the setting of the spring-perch bolts. My invention is particularly designed to provide a means whereby the axle may be twisted between these two bolts to provide the proper caster setting for the king-pin bolts.

My general object is as brought out above, and in association therewith it is also my object to provide a device of this general character which is of simple construction, easily applied and removed, and which can be operated by means of standard hydraulic jacks, such as are supplied with other types of axle-setting equipment, to the end that the shop using this particular piece of equipment will not be under the necessity of purchasing a jack if it already has other axle-setting equipment.

My invention comprises the novel parts and the novel combination and arrangement thereof, as shown in the accompanying drawings, described in this specification, and as will be more particularly defined by the claims which terminate the same.

In the accompanying drawings, I have shown my invention in a form which is now preferred by me, it being understood that various changes in the form and arrangement may be made within the scope of the appended claims.

Figure 1 is an elevation of my device from the front of the car, showing the same in place on the axle.

Figure 2 is an elevation of the same equipment from a viewpoint at the side of the car, the wheel and associated parts being omitted, and only the end of the axle being shown.

The axle, generally designated by the numeral 9, is provided with the nearly vertical aperture 90 for the reception of the spring-perch bolt 91, at the upper end of which is supported one end of the transverse spring 92. Ordinarily a spring shackle 93 forms the means of supporting the spring from the spring-perch bolt. The axle 9 is also apertured at its end, as indicated at 95, for the reception of a king-pin bolt 96, to the upper end of which is secured the steering arm, indicated at 97.

It is desirable to provide a means for twisting the axle between the apertures 90 and 95, and the space between them is not great, and moreover, is restricted by means of the steering arm 97, a brake-operating shaft and casing indicated at 98, and like devices. The means I have provided for this twisting operation comprises two hooked members complemental to each other and of generally planiform shape, adapted to lie substantially in contact with one another, and with lower ends that extend in opposite directions, between which may be supported a jack 2.

Each of these members may be made substantially like the other one, so that a description of one will suffice for both. The member has its upper end hooked, as indicated at 1, this hooked end engaging over an upper flange 94 of the axle 9. The hooked member then extends over the axle and down the opposite side, as indicated at 10, to a point where its edge engages the edge of a lower flange 99 of the axle, diagonally opposite the flange 94 engaged by the hook 1. Thence it extends beneath the axle, as indicated by the portion 11, and thence downwardly, as indicated by the portion 12, until it reaches a point on the same side of the axle as the hook 1, but beneath this point.

The two complemental members, being oppositely applied, each hooked end 1 engages the opposite side of the upper flange at 94, as already described, and at 94', and each rear portion 10 engages an opposite side of the lower flange, 99 or 99'. Their lower ends are in adjacent planes, and in fact, their lower ends may be swelled somewhat out of the general plane of the members to overlap slightly, as may be seen in Figure 1. At their lower ends they are provided with means for engagement by the opposite ends of a jack 2; for instance, the base of the jack may be provided with a hook 20, and the plunger 21 of the jack is provided with a hook 22, each of these hooks 20 and 22 being received upon pins 30 and 3 received in or forming part of the lower end 12 of the hooked members. For one of these members A, the pin 3 may lie between bifurcations which make up the lower end 12, while the pin 30 of the other member B may project outwardly from the side of the member B, so that the axis of the jack 2 is parallel to the general common plane of the two members and closely adjacent thereto.

It will be observed, in Figure 1 in particular, that the upper hooked ends 1 of these twisting members have their sides cut inwardly from the general plane of contact C between the two members, so that the sides of these hooks 1 engage the flanges 94 and 94' at points which are spaced somewhat longitudinally of the axle, and this gives room for the twisting action.

Now as the jack is expanded the lower legs 12 of the two members are separated, the points 99 and 99' serving as fulcrums. This separation of the legs 12 causes a twisting action from a general plane, as indicated at D in Figure 2, to such a plane as might be indicated by the line E. To obtain a reverse twisting, the twisting members would be applied with the member B nearer the outer end of the axle, in other words, reversed from the position shown in Figure 1, and it is for this reason that the pin 30 extends at opposite sides of the member B.

Such a device may be easily applied, each member separately, and without removing the wheel from the axle or the axle from the car. It is not necessary in most cases to support the car in any way except upon its wheels, and thus the device may be quickly and easily applied and the twisting done in a short time, the car being in such condition that it may be gaged readily and the amount of twisting determined.

What I claim as my invention is:

1. An axle-twisting device comprising a pair of complemental members each hooked at its upper end to engage over the edge of an upper flange of the axle, and its lower end lying at the same side of the axle and below such point of engagement, an intermediate portion engaging the edge of the lower flange at the opposite side of the axle, and a jack engaged with the two lower ends and operable to separate them to apply a twisting stress.

2. An axle-twisting device comprising a pair of complemental members, each having a hook at its upper end adapted to engage over an upper flange of an axle, thence extending over the top and down the opposite side of the axle to a bearing at the lower flange, thence extending beneath the axle and finally downward, the two complemental members being oppositely applied, whereby their hooks engage opposite sides of the top flange and their lower ends extend in opposite directions, and a jack member engaged with each of said lower ends and operable to separate them.

3. An axle-twisting device as in claim 1, the two complemental members being each substantially planiform, and adapted to lie closely adjacent one another, and means at the lower end of each for engagement by the jack in a plane adjacent and parallel to the meeting plane of the two members.

4. An axle-twisting device comprising a pair of complemental substantially planiform members each hooked at its upper end to engage the edge of an upper flange of the axle, the lower ends of each member lying at the same side of the axle as its respective hook and therebelow, an intermediate portion of each member engaging the edge of the lower flange at the opposite side of the axle, the two members being reversely applied to the axle, whereby they lie substantially in contact with their lower ends oppositely directed, the side faces of the hooked end of each member lying inward from the general planes of their side faces, whereby to space their points of engagement longitudinally of the axle, and means for spreading apart the lower ends of said members to apply a twisting stress to the axle.

5. An axle-twisting device comprising two complemental members having upper ends engageable with opposite upper flanges of the axle, and each extending from such point of engagement over the axle and downward to a point of engagement at the diagonally opposite lower flange, and means operable between the lower ends of the members to move their upper ends together, the second point of engagement serving as a fulcrum.

Signed at Seattle, King County, Washington, this 17th day of October, 1930.

CLAUDE C. BENNETT.